Oct. 26, 1965          J. L. OUTEN          3,214,689
PORTABLE BATTERY OPERATED CONTINUITY TESTER
WITH BUZZER AND DETACHABLE TEST LEADS
Filed Sept. 23, 1960
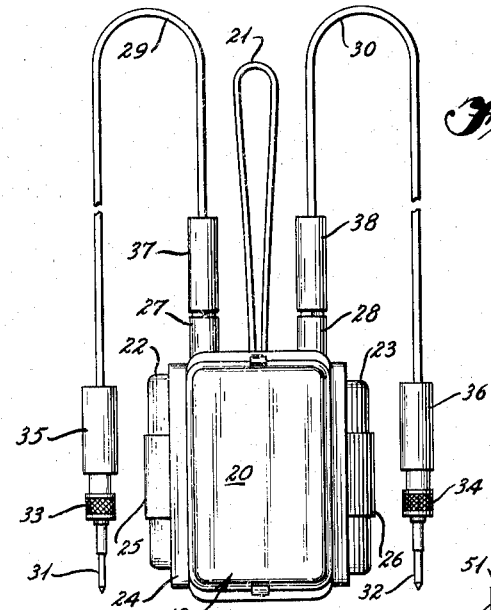
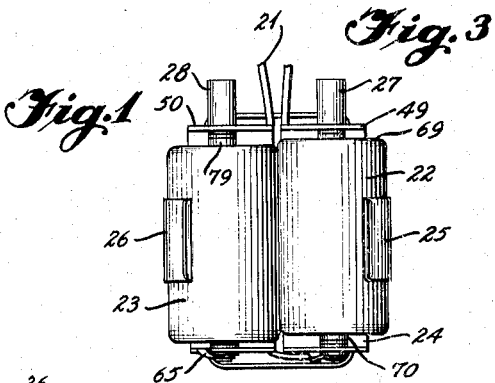
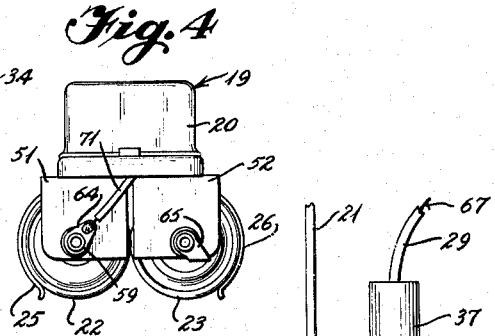
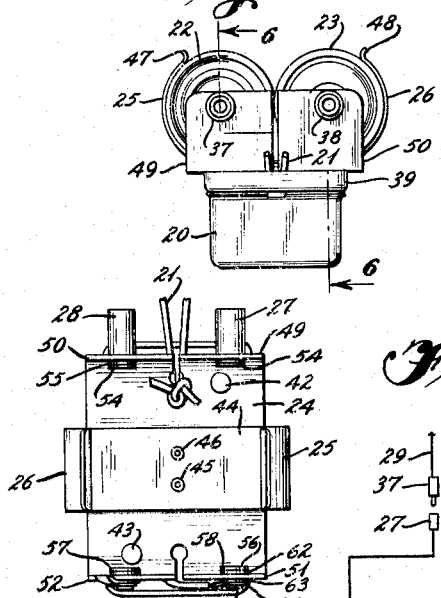
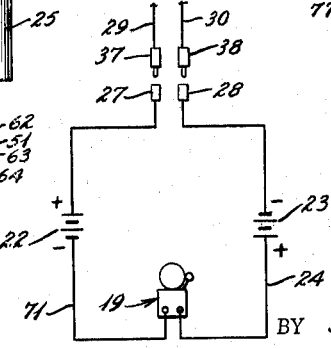
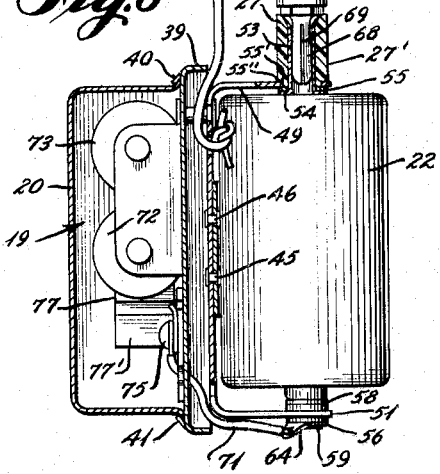
INVENTOR
Joseph L. Outen
BY *Robert E. Kleve*
ATTORNEY

United States Patent Office 3,214,689
Patented Oct. 26, 1965

3,214,689
PORTABLE BATTERY OPERATED CONTINUITY TESTER WITH BUZZER AND DETACHABLE TEST LEADS
Joseph L. Outen, P.O. Box 815, Kannapolis, N.C.
Filed Sept. 23, 1960, Ser. No. 57,951
2 Claims. (Cl. 324—51)

The invention relates to electric continuity testers and more particularly to portable continuity testers operated by flashlight cells for testing and determining the existence of open lines, breaks, or short circuits and grounds, and in investigating the continuity in switches, fuses, and other components of electrical circuitry systems as may be installed in domestic households and commercial buildings and the like.

Different forms of continuity testers have been offered in the past, however many of these have been objectionable to a large extent, from the standpoint of bulk, size, and unwieldiness in their operation, and none have been entirely satisfactory from the standpoint of this efficiency in operation and simplicity and cost of manufacture.

It is an object of this invention to overcome these forementioned deficiencies and to provide a novel, improved continuity tester, which may be inexpensively produced, and easily operated, and compact in nature to enable easy portability from one location to another.

It is a further object of the invention to provide a portable continuity tester which includes a novel simplified construction and operates with flashlight cells to actuate an electrical buzzer indicating continuity in the line or circuit.

It is a further object of the invention to provide an improved continuity tester which employs a novel, inexpensive framework, and overall construction enabling employing simplified electrical connectors, and rapid attachment of the test probes to the body of the tester, as well as a quick replacement and exchange of the flashlight batteries.

It is a further object of the invention to provide an improved, small compact continuity tester which is provided with flexible electrical probes, which may be slidably mounted to the tester, for ease in attachment, and which is received by an improved socket arrangement on the tester offering a direct contact with the flashlight cells for an electrical connection.

It is a further object to provide a novel continuity tester having improved means for mounting and connecting the cells to the tester and for cooperative mounting of the test probes in electrical connection therewith.

Further objects and advantages of the continuity tester invention will become apparent as the description proceeds, and when taken in conjunction with the accompanying drawings wherein:

FIG. 1 is a front elevation view of the continuity tester, disclosing its overall construction, and with the tester probes mounted in their operative position to the upright pair of mounting sockets.

FIG. 2 is a top plan view of the tester disclosing end structure of the test probes mounted on the tester body.

FIG. 3 is a rear elevation, with the test probes removed.

FIG. 4 is a bottom plan view of the continuity tester.

FIG. 5 is a rear plan view of the tester, with the dry cell or flashlight batteries removed, to expose the details of the U-shaped framework of the tester.

FIG. 6 is an enlarged cross sectional view of the tester along lines 6—6 of FIG. 2, setting forth the details of the test probe and the cooperating electrical connections on the tester body and disclosing the electro-magnetic buzzer within the housing on the opposite side of the framework, and its manner of cooperative mounting thereto.

FIG. 7 is a schematic diagram of the electrical circuit for the continuity tester.

Briefly stated, the invention comprises a portable tester having a U-shaped framework, a spring member having opposed spring arms for detachably retaining a pair of flashlight cell batteries to the U-shaped framework of the tester, an electro-magnetic buzzer mounted on the opposite side of the framework, electrically connected to the flashlight cell batteries, a pair of flexible test leads having test probes at their outer ends, and at their inner ends having prongs which are slidably mounted within friction sockets mounted to the U-shaped framework and extending upward therefrom, with the sockets aligned centrally of and in direct contact with the electric conductive ends of the flashlight cells to provide an electrical connection with the test probes, whereby when the test probes are applied to circuits or lines having where there is continuity between the probes, the batteries will energize the buzzer, causing it to produce sound, and a loop attached to the tester for carrying or transporting the tester about from place to place.

With further reference to the drawings, FIG. 1 best illustrates the overall exterior structure of the electrical continuity tester invention disclosing the rectangular metal cover 20, for the electrical buzzer therein the flexible loop 21 for carriage or portage of the device, the pair of flashlight batteries 22 and 23, the sheet metal U-shaped tester framework 24 for receiving the batteries 22 and 23, and the pair of opposed spring arms 25 and 26 for clamping and retaining the flashlight batteries in the U-shaped framework, also disclosed are a pair of hollow sockets 27 and 28 mounted to the upper end of the U-shaped framework, a pair of flexible test leads 29 and 30, have their metal test probes 31 and 32 mounted on the outer ends, with knurled portions 33 and 34 and insulated annular plastic gripping collars 35 and 36 forming a portion of the test probe structure. And the inner ends of test leads are another pair of annular plastic collars 37 and 38.

The rectangular cover 20, is detachably mounted to a metal buzzer base support 39, by means of clips or lugs 40 and 41. The metal buzzer support, in turn, is mounted to the U-shaped framework by means of metal rivets 42 and 43.

A curved metal strap having a center portion 44, with integrally connected outwardly opposed spring arms 25 and 26 is mounted laterally to the framework by means of similar rivets 45 and 46 (FIG. 5). The opposed spring arms each have outturned lips 47 and 48 to facilitate the mounting of the batteries within the framework.

The metal U-shaped tester framework 24 comprises a base 24' and a pair of integrally connected, perpendicularly extending, upper horizontal metal flanges 49 and 50 (FIGS. 2 and 5) with a narrow elongated slot 49' separating the flanges from each other, so that they may flex individually. A similar pair of lower horizontal flanges 51 and 52 (FIGS. 4 and 5) are integrally connected to the base 24' and extend perpendicularly outward therefrom, with a similar slot 51' separating the flanges for individual flexibility.

A pair of hollow elongated electrical sockets 27 and 28, are mounted to the upper flanges 49 and 50, centrally along the upper portion of each flange and extending upwardly vertically in parallel spaced relation to each other. The elongated electrical sockets 27 and 28 each include cylindrical plastic collars 27' with hollow metal sleeves 53 pressed within the collars. Each of the hollow sleeves 53 are provided with an integrally connected metal ridge 54 which provide the means for mounting the socket assembly to the flanges. The metal ridges 54 are press fitted against angular fibrous insulation ring 55, which annular ring, in turn, is forced against the edge adjacent the aperture 55' in each flange, with grooves 55" on the plastic collar on the opposite side of the flange cooperating with the metal ridges 54 to thereby hold each socket in place.

The metal sleeves 53 of the sockets 27 and 28 provide a direct electrical connection with the batteries on the side of the flanges, opposite the sockets, by metal ridge 54 of the sleeves 53 directly and centrally engaging the metal base of one of the flashlight batteries and the electrode of the other flashlight battery. The sleeve 53, by virtue of their insulation rings, have no electrical connection with the flanges to which they are attached.

The flashlight batteries 22 and 23 are mounted in reverse relationship to one another to facilitate their being connected in a series with respect to each other, in the electrical circuit.

The two flashlight batteries 22 and 23 are mounted into the U-shaped tester framework 24, by forcing toward the base of the tester framework and pressing between the resilient upper and lower flanges 49 and 50, 51 and 52.

The spring arms 25 and 26, will flex laterally outward to accommodate the entry of the flashlight batteries, and as the batteries are moved completely into the framework, the spring arms will press converge against the exterior surfaces of the batteries to partially surround the batteries and retain them in the tester framework in cooperation with the upper and lower flanges, retaining the batteries therein.

The lower horizontal flanges 51 and 52 are each provided with short metal sleeves or rivet eyelets 56 and 57, which serve as electrical connections at the lower ends of the batteries, the short sleeve or eyelet connections 56 and 57 consist of short pressed fitted rivets each having flared ridges 58 and 59, and flared outer ridges 60 and 61, with a metal conduit extending from one ridge to the other to provide an electrical connection therebetween.

The eyelet connections each have a pair of fibrous insulation rings 62 and 63 prevent electrical contact of the eyelets to their adjacent flanges, by the rings being interposed between the inner ridge and the flange and the outer ridge and the flange.

Metal electrical tabs 64 and 65 are mounted between the outer insulation ring 63, and the metal ridge 59 of the sleeve, and are in direct electrical contact with the ridge 59, although insulated from the metal flanges.

The one metal tab 65 is bent against the flange 52 (FIGS. 4 and 5) to provide an electrical ground to the framework for the batteries, in completing the circuit.

However, as a modified form of the invention, the one metal tab 65, as well as the one sleeve connection 57, is entirely dispensed with, and metal base of the flashlight battery 23 instead directly contacts the flange 52, to provide the grounding of the circuit to the framework of the tester.

The plastic loop or cord 21 is tied to the U-shaped framework by extending the ends of the plastic cord through the aperture 66, in the base of the framework, with the ends of the cord tied in a knot 66', on the opposite side thereof, to retain the loop to the tester.

Each of the flexible test leads 29 and 30, have an electrical wire 67 running along their length (FIG. 6) with a plastic coating about the exterior of the wire. At the inner ends of each of the two test leads are annular plastic collars 37 and 38, respectively. Within each collar is a metal core electrically connected to the wires 29' of the test leads. Projecting outwardly from the collar is a prong or rod 68, which is integrally connected at its inner end to the metal core of the collar. The rods 68 are each slidably receivable into the metal sleeves 53 of each of the sockets 27 and 28, mounted on the framework of the tester.

The rod or post 68, is provided with radial slits 69, perpendicular to one another, and extending in length along the length of the rod or prong. The slits 69 enable the rod to be compressed to a smaller diameter, consequently the rods 68 are provided with a diameter, when compressed, which is slightly larger than the interior diameter of the sleeve 53. As a result, when the rod or prong is inserted into the sleeve, the slits in the prong will enable the prong to be compressed to a sufficiently small diameter to allow the nose and rearward portion of the prong to be slidably inserted into the sleeve. The reactive force as a result of the compression of the rod portion will press the outer surfaces of the rod or prong against the sleeve, with substantial frictional force, sufficient to independently retain the prongs in the sleeves. The test leads may be readily detached, however, since only a relatively small amount of manual effort, on the part of the operator of the tester, is necessary to overcome the friction and slidably remove the prongs at the end of the leads thereby detaching the test leads.

The electrical circuit of the improved continuity tester invention is best illustrated in FIG. 7. This figure discloses the basic series circuit of the tester, with the flashlight batteries connected in series with one another, and in series with the electro magnetic buzzer 19.

In more detail, the electrical circuit of the tester is as follows:

The complete series electrical circuit beginning with test probe 31 extends along wire 67 of the test lead 29 into the collar connection 37, where it directly connects with the metal core of interior of the prong 68, enclosed by the collar. The circuit then passes out through the prong 68 onto the metal sleeve 53 of the socket connection 27. The inner metal ridge 54, of the sleeve 53, directly contacts the metal base 69' of the flashlight battery 22. This provides the circuit with an electrical connection to pass on through the battery 22, to the electrode 70 of the battery 22. The rivet sleeve 56 on the lower flange 51 directly engages the electrode 70 of the battery by its inner ridge 58, and presses the current through the rivet sleeve, to the outer ridge 59 of the sleeve. The outer ridge 59 directly engages the metal tab 64, and an insulated wire 71 is soldered to the tab 64, thus enabling the circuit to pass from the battery 22, through the rivet sleeve 56, and through the wire 71, to the metal screw 75, mounted immediately adjacent the buzzer 19.

The buzzer 19 is of a conventional type, consisting of two electromagnetic coils 72 and 73, wound in series with one another and with a single wire and with one end of the wire connected to the metal screw 75. The wire wound on the coil is insulated. The screw 75, is insulated from the buzzer base support and housing as well as the U-framework of the tester. Consequently, the circuit is not grounded, and continues on through the wire or coil 72 and then through coil 73, and onto a metal post 76. A metal spring 77, which is spring biased against the metal post 76, and consequently the circuits passes from the post 76 to the metal spring.

The current passes on from the metal spring 77, to the buzzer support, since the spring 77, is directly connected to the upturned flange 77' of the metal buzzer support 39. The buzzer support is connected to the U-shaped framework by metal rivets, and consequently at this point, the circuit is grounded to the U-framework of the tester.

The circuit then passes on from the grounded flange 52 of the framework, to the metal tab 65, bent against the flange 52, and from the tab through thee other metal rivet sleeve connection, via its ridge 59, to the metal base 78, of the other battery 23, which directly contacts the inner ridge of the rivet sleeve.

The current continues on through the other flashlight battery 23, and from the electrode 79, of battery 23 through socket 28, and prong or rod 38, in a manner identical to that described with respect to socket 37 and 27, and along the wire of the test lead 30, to the other test probe 32.

Thus, a complete circuit is provided, and the test probes 31 and 32 are placed together, thus closed the circuit, and energize the buzzer, the buzzer operating by the energization of electro-magnetic coils 72 and 73, which magnetically draw the metal spring 77 away from the post 76. This momentarily opens the circuit, and deactivates the coils, with the magnetic field release of the coils, allowing the spring to fall back again into contact against the post. Its contact with the post reactivates the coils drawing the spring out again, and this activation and deactivation operation continues to repeat over and over again, with the creation of a buzzing sound. The sound will, of course, be created throughout the effective life of the batteries, each time the probes are placed together to complete the circuit.

The test probe sockets, by their location and structure in cooperation with the structure of the U-shaped framework, provides one of the improved features in the construction of the continuity tester. The test probe sockets being mounted directly on the upper flanges, and aligned centrally of the axis of the batteries, with conductive portion extending through the flanges, directly contact the batteries, and greatly simplified its overall construction.

Also the test lead prongs in cooperation with the prong receiving sockets on the framework, enable a rapid sliding engagement and disengagement of the test lead relative to the tester.

The test probe sockets and test probes connection are located on top of upper flanges so that the tester is self-supporting on a flat surface, and may easily rest upright. The tester rests upon the lower flanges 51 and 52, short sleeve connections, and the lower edge of the buzzer support, as in the position as shown in the vertical or side elevation view of FIGURE 1.

Also, test sockets being on the top, the tester probes are more readily attached as well as used for testing, since the tester need not be tipped to one side in order to attach the leads. Also the continuity tester body will set in this upright position independently, after the test leads have been attached, and while the testing operation is being carried on.

Furthermore, the upper flanges as well as the lower flanges 49 and 50, and 51 and 52, of the framework of the continuity tester both have sufficiently resilience to firmly press against the ends of the batteries to assure good electrical contact, and to facilitate retaining the batteries in the framework of the tester. The cooperating spring arms 25 and 26, cooperate with the flanges toward retaining the flashlight batteries in the framework of the device.

The slots in the U-shaped framework of the tester, separating the flanges, enable each test probe socket as well as each sleeve connection to individually compress against their respective end of each battery, thereby adjusting for different slightly tolerances that may be involved, with respect to each connection.

In testing for continuity, the test probes must first be attached to the continuity tester and is then operated by placing the probes on the inlet and outlet connections of switches, and fuses, for example, and if the buzzer sounds, it indicates that there is electrical continuity in the circuit between the two probes, since current must pass between the two probes in order to actuate the buzzer. In a similar manner, the probes may be engaged to test the continuity of various electrical circuits for the determination of faulty lines, open circuits, etc. The probes, at the outer ends of the leads may if necessary, be replaced by clamps, for certain types of testing operations.

The continuity tester may be carried about, by hooking the plastic loop 21 to operator's belt, by the operator inserting his hand and wrist through the loop and grasping the tester with his hand, or by merely grasping the loop.

Thus it may be seen that a novel inexpensive tester is provided, with a unique simplified construction, with rapidly attachable test probes for testing electrical continuity. It should be readily understood and it will be obvious to those skilled in the art, that various changes may be made in the device without departing from the spirit and scope thereof, and therefore the invention is not limited by that which is shown in the drawings and described in the specification, but only as indicated in the appended claims.

I claim:

1. A portable continuity tester comprising a pair of flashlight batteries, a resilient U-shaped metal plate comprising a flat plate base portion with a pair of plate legs projecting laterally from said base portion and integrally connected thereto to form a U-shaped cross-section, said plate legs resiliently retaining said pair of flashlight cells therebetween in side by side relation a second U-plate disposed transversely to the first mentioned U-plate and engaging said batteries, said first and second U-plates being open across the outer ends of its legs, a pair of cylindrical sockets mounted to the exterior of one of said plate legs with said sockets disposed in spaced relation to one another, said sockets projecting outwardly in length from said one plate leg with their longitudinal axis parallel to and extending in the same general direction as the longitudinal axis of said flashlight cells, one of said sockets being in direct electrical engagement with the end of one of said flashlight cells and the other of said sockets being adjacent and in direct electrical engagement with the end of the other of said flashlight cells, a pair of wire test leads having prongs at one end slidably inserted into said sockets and probes at the other end, said pair of sockets each comprising an outer insulating sleeve and an inner metal sleeve with said inner metal sleeves in electrical contact with said prongs when inserted, said metal sleeve having an end projecting toward said other plate leg and through said one plate leg, insulating washer means surrounding said end of said metal sleeve along the interior face of said one leg, said metal sleeve having an outurned flange at its interior end to secure said washer and sockets to said one leg, said outurned flange being adapted to directly engage said batteries at their said one ends and provide said direct electrical engagement with said batteries, and buzzer mounted to the exterior of said base of said first mentioned U-plate, a cover for said buzzer along the base portion of said first U-plate, said cover being substantially co-extensive in length and width with said base portion, cord means forming a loop and attached to said base portion adjacent said one plate leg whereby said tester may be hung from the belt of an operator with the cover resting adjacent the operator, said other plate leg of said plate having electrical contacts engaging said batteries at their other end with connecting wires connecting said buzzer in series between said other ends of said batteries via said contacts whereby when said probes are placed on surfaces having electrical continuity therebetween, said continuity will complete the circuit and the buzzer will sound.

2. A portable continuity tester comprising a U-shaped resilient metal plate, said U-plate comprising a pair of plate leg portions parallel to one another and projecting laterally from a base, a pair of sleeve sockets mounted in spaced relation to one another on the exterior of one of said plate legs and projecting outward a pair of flashlight batteries, said plate legs resiliently retaining said pair of flashlight cells therein in side by side relation, one of said sockets being adjacent and in electrical engagement with the end of one of said batteries and the other of said sockets being adjacent and in direct electrical engagement with the end of the other of said batteries, a buzzer mounted to the exterior of the base of said U-shaped plate intermediate said legs, a cover detachably mounted to the exterior of said base and enclosing said buzzer, a pair of test leads having prongs at one end slidably inserted into said sockets and probes at the other end for tesing continuity, said sockets each having an inner metal sleeve in contact with said prongs when inserted, said sockets each having an insulated sleeve surrounding said metal sleeve with said insulated sleeve and metal sleeve projecting toward and through the interior face of said one leg, said metal sleeves directly engaging said batteries at their said ends to provide said electrical engagement between said batteries and said sockets, a second U-plate positioned laterally of said first U-plate, said first mentioned and said second U-plate being open across the outer ends of their legs, whereby said batteries may be removed from said U-plates in direction transversely of the ends of the batteries, said other leg of said first mentioned U-plate having electrical contacts engaging the other end of said batteries, connecting wires connecting said buzzer in series between said other ends of said batteries via said contacts whereby when said probes are placed on surfaces having electrical continuity therebetween said continuity will complete the circuit and the buzzer will sound.

References Cited by the Examiner
UNITED STATES PATENTS

| | | |
|---|---|---|
| 1,433,264 | 10/22 | Fahlenberg _____ 324—53 |
| 1,913,696 | 6/33 | Wiley et al. _____ 200—60 X |
| 2,231,660 | 2/41 | Carlotte et al. _____ 324—53 |
| 2,413,484 | 12/46 | Berger _____ 324—53 |
| 2,418,141 | 4/47 | Salazar _____ 136—173.4 X |
| 2,478,129 | 8/49 | Powell _____ 324—53 X |
| 2,545,808 | 3/51 | DePree _____ 324—51 |
| 2,703,385 | 3/55 | Curd _____ 324—53 |
| 2,794,167 | 5/57 | Jones _____ 324—53 |
| 2,879,316 | 3/59 | Enikeieff _____ 136—173 |
| 2,983,778 | 5/61 | Munse _____ 136—173 |
| 3,061,776 | 10/62 | Rosenstrach _____ 324—53 |

WALTER L. CARLSON, *Primary Examiner.*

SAMUEL BERNSTEIN, JAMES W. LAWRENCE,
*Examiners.*